UNITED STATES PATENT OFFICE.

WILHELM HIEMENZ AND WALTER KROPP, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PHARMACEUTICAL COMPOUNDS.

1,056,542.  Specification of Letters Patent.  Patented Mar. 18, 1913.

No Drawing. Application filed June 10, 1911. Serial No. 632,424.

*To all whom it may concern:*

Be it known that we, WILHELM HIEMENZ and WALTER KROPP, doctors of philosophy, chemists, citizens of the German Empire, residing at Elberfeld, Germany, have invented new and useful Improvements in New Pharmaceutical Compounds, of which the following is a specification.

We have found that the hitherto unknown derivatives of iodocinnamic acid of the formula:

($X = H$ or $I$, $R = H$ which may be replaced by a substituent e. g. $-C_2H_5$, $-CH_3$, $CONH_2$, etc.,) are stable pure iodin preparations. They give off iodin in the organism and have proved to be valuable remedies in medicine, especially for treatment of venereal diseases, an average dose being from 2-3 grams. Clinical experience has shown that the symptoms of iodism are very rarely observed in their administration.

The process for producing the new compounds consists for instance in treating the chlorids of the iodocinnamic acids, such as of diiodocinnamic acid, beta-iodocinnamic acid, etc., with ammonia or amins.

Our new preparations are crystallizable compounds. They are insoluble in water and are decomposed by treatment with a hot alcoholic solution of caustic potash.

In order to illustrate the new invention, we can proceed as follows, the parts being by weight:—

Example 1: 400 parts of diiodocinnamic acid are slowly added to an emulsion of 208 parts of finely powdered $PCl_5$ in chloroform. When the evolution of HCl ceases chloroform and $POCl_3$ are distilled off and the chlorid of the diiodocinnamic acid is introduced into an aqueous solution of ammonia which is stirred. The precipitate is filtered off and washed with water, alcohol and ether. It crystallizes from glacial acetic acid. On being heated to 200° it is decomposed.

Example 2: In order to produce the ureid of the diiodocinnamic acid the chlorid of this acid is heated with 2½ molecules of urea on the water bath. The mass thus obtained is boiled with water and then with alcohol. The ureid melts at 185-186° C. It is difficultly soluble in most solvents.

We claim:—

1. As new products acid amids of iodocinnamic acids, which products are practically insoluble in water and decomposed by treatment with a hot alcoholic potash solution, substantially as described.

2. As new products acid amids of di-iodocinnamic acid, which products are practically insoluble in water, and are decomposed by treatment with a hot alcoholic potash solution, substantially as described.

3. As new products the unsubstituted acid amids of iodo-cinnamic acids of the formula $A.NH_2$, where A is the acidyl radical of the acid amid, which bodies are practically insoluble in water, and are decomposed by treatment with a hot alcoholic potash solution, substantially as described.

4. The herein described amid of the diiodocinnamic acid of the formula:

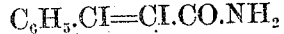

which crystallizes from glacial acetic acid and which decomposes on being heated to 200° C., substantially as described.

In testimony whereof we have hereunto set our hands in the presence of two subscribing witnesses.

WILHELM HIEMENZ. [L. S.]
WALTER KROPP. [L. S.]

Witnesses:
ALBERT F. NUFER,
ALFRED HENKEL.